(12) United States Patent
Rao et al.

(10) Patent No.: US 9,210,316 B2
(45) Date of Patent: Dec. 8, 2015

(54) METHOD AND SYSTEM FOR DETECTING AND CAPTURING FOCUSED IMAGE

(75) Inventors: Shyam Vasudeva Rao, Bangalore (IN);
K. Chandrasekhar, Bangalore (IN);
Bharath Hegde, Bangalore (IN);
Srinidhi Srinath, Bangalore (IN);
Chetan M. Chatra, Bangalore (IN)

(73) Assignee: FORUS HEALTH PVT. LTD.,
Bangalore, Karnataka (IN)

( * ) Notice: Subject to any disclaimer, the term of this patent is extended or adjusted under 35 U.S.C. 154(b) by 18 days.

(21) Appl. No.: 14/240,159

(22) PCT Filed: Aug. 23, 2012

(86) PCT No.: PCT/IB2012/054262
§ 371 (c)(1),
(2), (4) Date: Feb. 21, 2014

(87) PCT Pub. No.: WO2013/035004
PCT Pub. Date: Mar. 14, 2013

(65) Prior Publication Data
US 2014/0192221 A1 Jul. 10, 2014

(30) Foreign Application Priority Data
Sep. 5, 2011 (IN) ............................ 3051/CHE/2011

(51) Int. Cl.
*H04N 5/76* (2006.01)
*H04N 5/232* (2006.01)
*H04N 5/14* (2006.01)
*H04N 5/262* (2006.01)
*H04N 9/31* (2006.01)
*G03B 13/36* (2006.01)

(52) U.S. Cl.
CPC ............ *H04N 5/23212* (2013.01); *G03B 13/36* (2013.01); *H04N 5/142* (2013.01); *H04N 5/2622* (2013.01); *H04N 5/76* (2013.01); *H04N 9/3191* (2013.01)

(58) Field of Classification Search
CPC . H04N 5/23212; H04N 5/142; H04N 5/2622; H04N 5/76; H04N 9/3191
USPC ............. 348/180, 187, 252, 345, 349, E5.052
See application file for complete search history.

(56) References Cited

U.S. PATENT DOCUMENTS 5,396,336 A * 3/1995 Yoshii et al. .................. 348/345
7,899,264 B2 * 3/2011 Stewart ......................... 382/255

(Continued)

FOREIGN PATENT DOCUMENTS

JP 2002-209135 A 7/2002

*Primary Examiner* — Hung Lam
(74) *Attorney, Agent, or Firm* — Drinker Biddle & Reath LLP (57) ABSTRACT

The embodiments herein provide a system and method for detecting and capturing a focused image. The system comprises of an image capturing unit, edge detection unit and a focusing unit. The image capturing unit obtains plurality of images sequentially. The edge detection unit identifies region of interest in each of the obtained images and calculates edge strength value for the identified regions. The edge detection unit determines peak edge value from the edge strength values. The edge strength value quantifies degree of focus in the identified region. If the identified region is more focused, the number of edges is relatively more when compared with out-of-focus region. The peak edge value indicates that the identified region is well focused. The focusing unit causes the image capturing unit to capture focused image when the edge strength value reaches a predefined value of the peak edge value.

7 Claims, 6 Drawing Sheets

(56) References Cited

U.S. PATENT DOCUMENTS

| | | | |
|---|---|---|---|
| 8,724,009 B2 * | 5/2014 | Tay | 348/345 |
| 2003/0118245 A1 | 6/2003 | Yaroslavsky et al. | |
| 2009/0073304 A1 * | 3/2009 | Kumagai et al. | 348/345 |
| 2010/0033617 A1 | 2/2010 | Forutanpour | |
| 2013/0182961 A1 * | 7/2013 | Tay | 382/199 |

* cited by examiner

Input levels

METHOD AND SYSTEM FOR DETECTING AND CAPTURING FOCUSED IMAGE

CROSS-REFERENCE TO RELATED APPLICATION

The present application claims priority to Indian patent application serial number 3051/CHE/2011 filed on Sep. 5, 2011, the entire contents of which are incorporated by reference.

TECHNICAL FIELD

The present disclosure relates to focused image capturing. More particularly, embodiments of the disclosure relate to a method and system for detecting and capturing a focused image.

BACKGROUND OF THE DISCLOSURE

When images are captured by a camera, there are a number of factors that adversely affect the quality of the resulting image. One important factor is the sharpness of the image. There are several attributes of the imaging system that affect the sharpness of the image, such as the quality of the lens and the MTF (Modulation Transfer Function) of the image capture medium. But beyond these fundamental characteristics, there are other image-dependent factors that can seriously degrade the sharpness, and therefore the quality of the image. These factors include overall lens defocus (e.g., due to attempting to capture an image of an object that is too close to the camera), defocus of the main subject (e.g., due to the camera auto-focusing on the wrong object in the scene), insufficient depth-of-field to capture the range of important object distances, fogging of the lens element due to condensation of water vapor, and smearing due to motion of the camera and/or objects in the scene.

In conventional photography using photographic film, it is usually not possible to determine whether the captured image has acceptable sharpness until the film is processed and printed. With the advent of digital cameras, it is possible to review the image at the time of capture. In theory, this allows the photographer to assess the quality of the image, and if necessary, capture another image to correct image quality problems. However, the quality of the preview displays used on most digital cameras is insufficient to adequately evaluate the image quality in many cases. As a result, the photographer may not realize that the quality of an image is poor until the image has been printed or previewed at a later time on a high-resolution display. As a result, the photographer may miss any opportunity to capture an improved image, or may be dissatisfied that time/money was wasted in making a print of a poor quality image. Therefore, there is a need for a means to automatically assess the sharpness of an image at the time the image is captured.

Complete auto focus feature exists currently. But automatic capture of the focused image does not exist. The existing solutions are expensive since they require additional electromechanical controls. Such electromechanical parts increase the possibility of malfunction, thereby adversely affecting equipment size, weight, availability, mobility and increased maintenance costs. Additional electromechanical parts also increase the constraints on deployment of the equipment due to environmental factors such as dust, temperature and humidity. Manual image capture results in images that differ in focus levels and thus differing image characteristics such as focus and brightness.

The present invention addresses these problems and proposes a method and system for automatic detection and capturing focused image with uniform image characteristics across multiple images taken in a camera.

SUMMARY

This section provides a general summary of the disclosure, and is not a comprehensive disclosure of its full scope or all of its features.

Additional features and advantages are realized through the techniques of the present disclosure. Other embodiments and aspects of the disclosure are described in detail herein and are considered a part of the claimed disclosure.

In one embodiment, the present disclosure relates to a method for detecting and capturing a focused image. The method comprises obtaining plurality of images sequentially by changing focus and identifying a region of interest in each of the obtained images. After identifying the region of interest edge strength values are calculated for each of the identified regions. The method further comprises of determining change in the edge strength value of the identified regions in consecutive images. Thereafter a peak edge value is determined from the edge strength values of the identified regions. Upon determining the peak edge value, the plurality of the images are obtained and the region of interest is identified in each of the obtained image till the edge strength value of one of the identified region reaches a predefined threshold value. The method changes the focus when the edge strength value of one of the identified region reaches a predefined threshold value and obtains plurality of the images. Finally an image is captured when the edge strength value of the identified region of one of the obtained image reaches a predefined value of the peak edge value.

In one embodiment, the present disclosure relates to a system for detecting and capturing a focused image. The system comprises of an image capturing unit which is configured to obtain plurality of sequence of images by changing focus. The system comprises of an edge detection unit configured to identify region of interest in each of the obtained images and to calculate edge strength values for each of the identified regions. The edge detection unit also detects a peak edge value when change in the edge strength value of the consecutive identified regions becomes negative. The system further comprises of a focusing unit configured to cause the image capturing unit to automatically capture the focused image when the edge strength value of one of the identified region reaches a predefined value of the peak edge value. In one embodiment, the predefined value is 90% value of the peak edge value.

In one embodiment, an indication to change the focus is provided to an operator using two different colored half circles when the edge strength value reaches the predefined threshold value.

In one embodiment, a focused image is captured when the two half circles are aligned to form a circle.

In one embodiment, the method disclosed in the present disclosure eliminates plurality of the obtained images with identified regions having edge strength value less than configured threshold value.

In one embodiment, the technology disclosed in the present disclosure does not use electromechanical control for automatic detection and capturing of focused image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

An embodiment of the present disclosure provides a method and system for detecting and capturing a focused image. An image capturing unit obtains plurality of images of a subject sequentially by changing focus. An edge detection unit configured identifies region of interest in each of the obtained images and calculates edge strength values for each of the identified regions. The edge detection unit also detects a peak edge value when change in the edge strength value of the consecutive identified regions becomes negative. A focusing unit causes the image capturing unit to capture the focused image automatically when the edge strength value of the identified region in one of the obtained images reaches a predefined value of the peak edge value.

An edge in the image is nothing but a change in the gradient of the image. Edge detection refers to the process of identifying and locating sharp discontinuities in the image. The discontinuities are abrupt changes in pixel intensity which characterize boundaries of objects in the image. Number of pixels present in the image is directly proportional to the edge strength value.

In an embodiment, the present disclosure needs no additional electromechanical parts for automatic detection and capturing of the focused image. Such electromechanical parts increase the possibility of malfunction, thereby adversely affecting equipment size, weight, availability, mobility and increased maintenance costs. Additional electromechanical parts also increase the constraints on deployment of the image capturing device due to environmental factors such as dust, temperature and humidity.

In an embodiment, the image capturing device captures plurality of the images with consistent focus even in varying lighting conditions.

Figure 1:
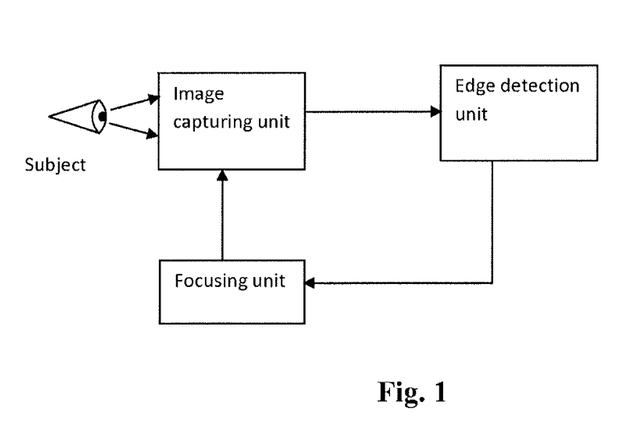
FIG. 1 is an exemplary block diagram which illustrates a system for detecting and capturing a focused image.

FIG. 1 diagrammatically illustrates a system for detecting and capturing a focused image. The system comprises of an image capturing unit, an edge detection unit and a focusing unit. An operator obtains plurality of images of a subject using the image capturing unit by changing focus. The focus is varied from a minimum focus point 0 towards maximum focus point 100 by an operator. The edge detection unit identifies region of interest in each of the obtained images and calculates edge strength value for the identified regions.

In an embodiment, the edge detection unit uses canny edge detector algorithm to calculate edge strength value for each of the identified region. The canny edge detector algorithm first performs smoothening of the identified region to eliminate noise. It then finds the gradient to highlight regions with high spatial derivatives. The algorithm then tracks along these regions and suppresses any pixel that is not at the maximum.

Edge strength value quantifies the degree of focus in the identified region. If the identified region is more focused, the number of edges i.e the change in intensity between neighboring pixels will be relatively more when compared with out-of-focus region. When the identified region is well focused, then its edge strength value i.e, the total number of pixels which are part of corresponding edge region is maximum.

Upon calculating the edge strength value for the identified regions, the images with identified region having edge strength value less than configured threshold value are eliminated to smooth the edge strength data.

The edge detection unit determines a peak edge value based on the edge strength values of the identified regions. The maximum edge strength value is referred as the peak edge value. The edge detection unit determines change in the edge strength value of the identified regions of the consecutive images. When the change becomes negative the image capturing unit obtains plurality of the images until the edge strength value of one of the identified region reaches the predefined threshold value. At this point the edge detection unit provides an indication to the operator that the identified region is going out of focus. Then the focusing unit changes the focus and causes the image capturing unit to obtain plurality of the images whose edge strength value is less than the predefined threshold value. The image capturing unit automatically captures the image when the edge strength value of the identified region in one of the obtained image reaches a predefined value of the peak edge value. In an embodiment, the predefined value is 90% value of the peak edge value.

Figure 2A:
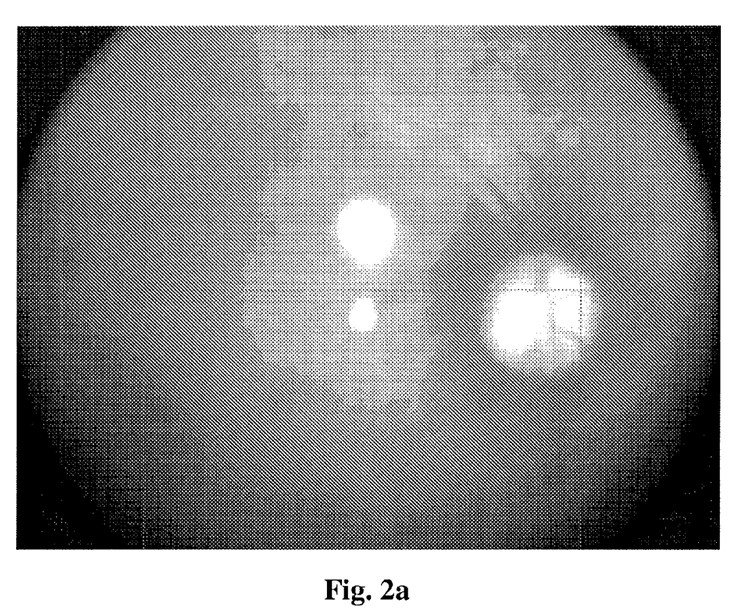
FIG. 2a shows an example image of a human retina under infrared illumination.
Figure 2B:
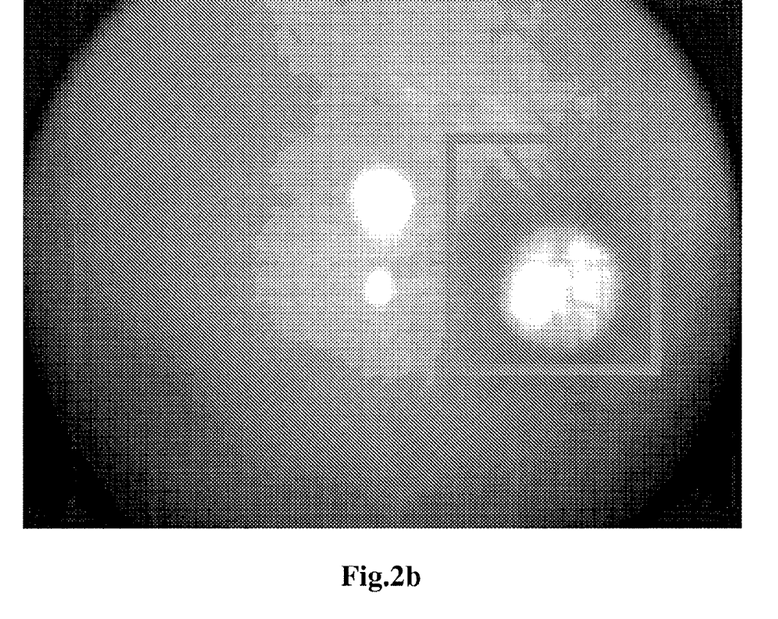
FIG. 2b shows the region of interest in the human retina.

The image capturing device with frame rate of 20 Frames per second (FPS) obtains plurality of sequence of images of a subject, for example the human retina in live mode. FIG. 2a shows the image of the human retina. The image capturing device uses infra red light for focusing. After obtaining the images, the edge detection unit identifies region of interest in each of the obtained images. In an embodiment the region of interest is optic disk which is one of the most prominent features visible in the human retina as shown in the FIG. 2b. Optic disk appears very bright compared to the rest of the retina when the retina is illuminated using an infra red light source.

Figure 2C:
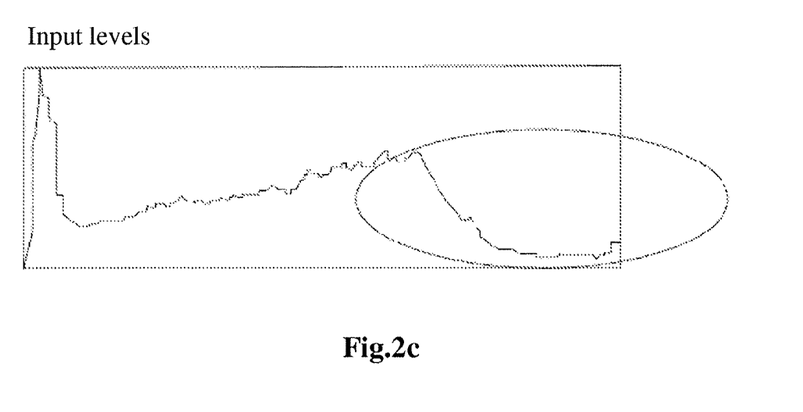
FIG. 2c illustrates a process of identifying the region of interest.
Figure 2D:
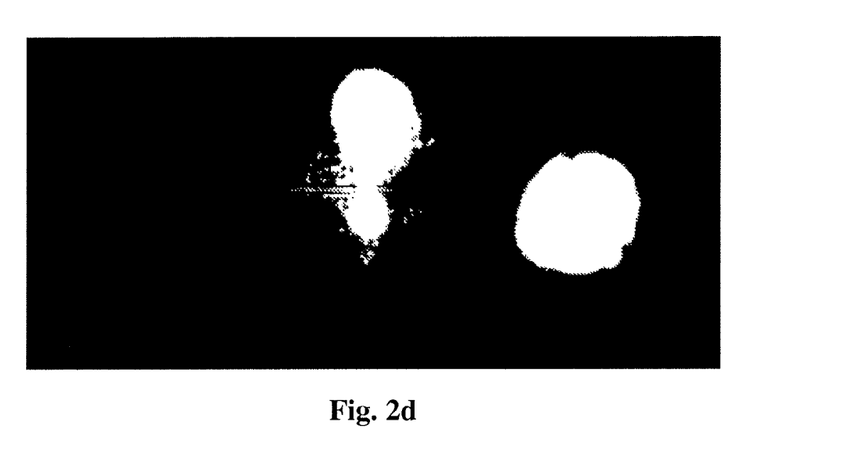
FIG. 2d illustrates a process of eliminating other artifacts in the image of the human retina based on size and shape criteria.
Figure 2E:
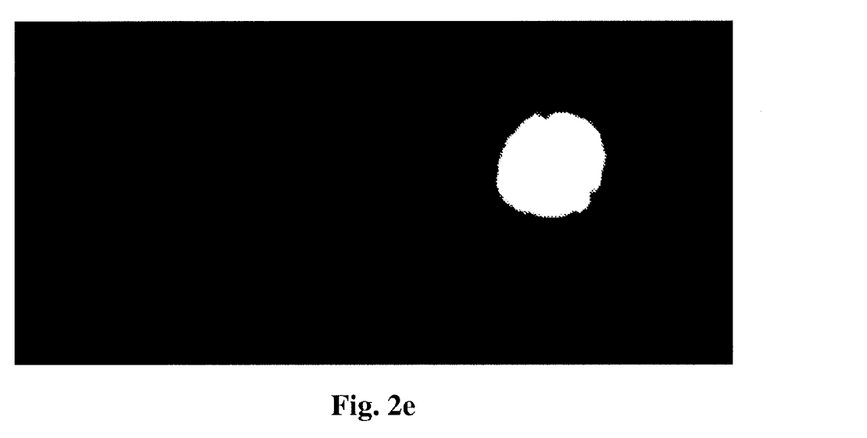
FIG. 2e shows the image after applying shape and size criteria.

The region of interest is identified using histogram analysis. In the histogram analysis, the obtained image is divided into several segments as shown in FIG. 2c. The last non-zero segment corresponds to the gray levels present in the optic disk region of the image. Based on the prior knowledge that optic disk is mostly circular in shape, other artifacts which are present in the obtained image (obtained using histogram analysis) as shown in the FIG. 2d is eliminated. FIG. 2e shows the image after applying the shape and size criteria. In an embodiment, contour-based shape extraction and minimum variance method is used to check circularity.

Figure 2F:
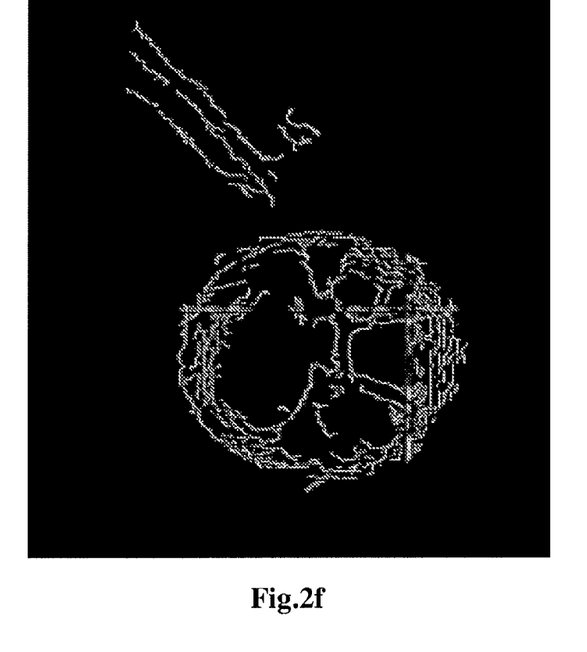
FIG. 2f shows the image with pixels contributing to the edges.

The output of the edge detector is an image with only those pixels which contribute to the edges as shown in the FIG. 2f. A count of pixels present in this edge image is directly proportional to the edge strength. And thus the edge strength value measures the degree of focus in the optic disk region.

Figure 3:
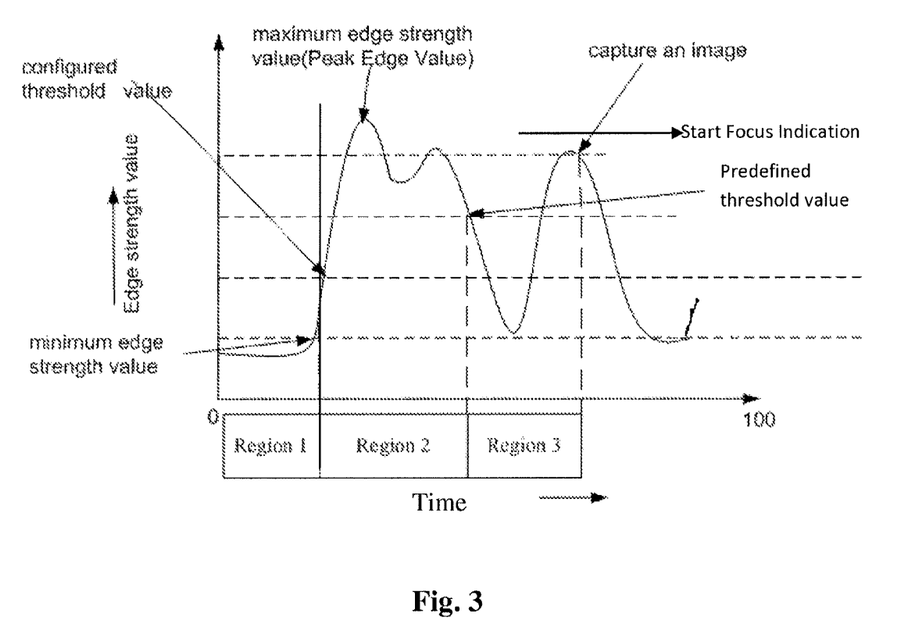
FIG. 3 shows graph which illustrates transition process of the present invention.

In an embodiment, the edge detecting unit calculates the edge strength values for the identified regions in each of the obtained images. A typical curve of edge strength values against time will have alternating crests and troughs of varying amplitude as shown in FIG. 3. The amplitude of crest or trough depends on the degree of focus as well as the object being focused. When the identified region is in focus the edge strength value will be at crest and when the identified region gradually goes out of focus its edge strength value will be decreasing towards trough. While refocusing, the edge strength will attain crest once again. Thus a well focused image is acquired by identifying second peak or the ascent towards the second peak.

A three stage transition process is performed to capture the focused image. In region 1, images from the subject are obtained and edge strength value of region of interest is calculated. In one embodiment an average of edge strength values of more than one image is taken for example five identified regions is taken to smooth the edge strength data. The first order differential of the data-set helps in eliminating the samples which are considered as noise. A configured threshold value is set for percentage change in the gradient of edge strength values. If the edge strength value of the region of interest in the obtained images is below the configured threshold value, the obtained image is ignored.

In region 2, the focusing unit causes the image capturing unit to display the plurality of the images to an operator while changing the focus. The edge detection unit identifies region of interest in each of the obtained images and calculates the edge strength value for the identified regions. A slope is calculated for the plurality of the edge strength values by determining change in the edge strength values of the consecutive images. If the slope is positive, the image capturing unit obtains images till the slope becomes negative and the point at which the slope becomes negative is saved as the peak edge value. In one embodiment there could be multiple peak edge values. Among these peak edge values, maximum peak edge value is considered.

In region 3, the operator is provided with an indication of image being out of focus, when the slope reaches a predefined threshold value. In an embodiment the predefined threshold value is the edge strength value of the images which is going out-of focus. At this point, the operator change focus towards the peak edge value and obtains plurality of the images. During this period the slope becomes positive again. The image capturing unit captures image when the edge strength value of the identified region in one of the obtained images reaches a predefined value of the peak edge value. In an embodiment, the predefined value is 90% value of the peak edge value.

Two differently colored half circles are used for focus indication. This is analogous to focus indicators typically used in manual-focus lenses of Single Lens Reflex (SLR) cameras. The extent of separation of the two half circles is directly proportional to the difference between the current edge strength and the detected peak edge value. The peak edge value is detected when the two halves are perfectly aligned to form a circle, which provides an indication that the focus is set. However, it has to be noted that different mechanism and methods could be used to indicate the variation of the focus from the peak edge value.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for detecting and capturing a focused image, said method comprising:
    obtaining a plurality of images of a subject sequentially by changing focus and identifying a region of interest in each of the obtained images;
    calculating an edge strength value for each of the identified regions;
    determining a change in the edge strength value of the identified regions in consecutive images;
    determining a peak edge value from the edge strength values of the identified regions;
    upon determining the peak edge value, obtaining a plurality of the images and identifying the region of interest until the edge strength value of one of the identified region reaches a predefined threshold value;
    changing the focus and a obtaining plurality of the images; and
    capturing an image when the edge strength value of the identified region in one of the obtained images reaches a predefined value of the peak edge value,
    wherein the predefined value is 90% value of the peak edge value.

2. The method as claimed in claim 1, wherein the focus is changed from a minimum focus point 0 towards a maximum focus point 100.

3. The method as claimed in claim 1, wherein the peak edge value is determined when the change in the edge strength value becomes negative.

4. The method as claimed in claim 1, wherein the images with identified regions having an edge strength value less than a configured threshold value are eliminated.

5. The method as claimed in claim 1, wherein the edge strength value is an average edge strength value of two or more identified regions.

6. A system for detecting and capturing a focused image, comprising:
   an image capturing unit configured to obtain a plurality of sequence of images by changing focus;
   an edge detection unit configured to identify a region of interest in each of the obtained images and to calculate edge strength values for each of the identified regions;
   the edge detection unit detects a peak edge value from the edge strength values of the identified regions; and
   a focusing unit configured to cause the image capturing unit to capture the focused image when the edge strength value of one of the identified regions reaches a predefined value of the peak edge value,
   wherein the predefined value is 90% value of the peak edge value.

7. The system as claimed in claim 6, wherein the edge detection unit detects the peak edge value when change in the edge strength value of the consecutive identified regions becomes negative.

* * * * *